(12) United States Patent
Lurye (10) Patent No.: US 9,992,151 B2
(45) Date of Patent: Jun. 5, 2018

(54) ANONYMOUS SOLICITATION OF A RESPONSE TO A USER-ASSOCIATED QUESTION

(71) Applicant: Samuel Lurye, Chicago, IL (US)

(72) Inventor: Samuel Lurye, Chicago, IL (US)

(*) Notice: Subject to any disclaimer, the term of this patent is extended or adjusted under 35 U.S.C. 154(b) by 315 days.

(21) Appl. No.: 14/844,723

(22) Filed: Sep. 3, 2015

(65) Prior Publication Data
US 2016/0065507 A1    Mar. 3, 2016

Related U.S. Application Data

(60) Provisional application No. 62/045,402, filed on Sep. 3, 2014.

(51) Int. Cl.
| | |
|---|---|
| *H04L 29/06* | (2006.01) |
| *H04L 12/58* | (2006.01) |
| *H04L 29/08* | (2006.01) |
| *H04W 4/20* | (2018.01) |
| *H04W 12/02* | (2009.01) |

(52) U.S. Cl.
CPC .............. *H04L 51/32* (2013.01); *H04L 51/34* (2013.01); *H04L 63/0407* (2013.01); *H04L 63/0421* (2013.01); *H04L 67/104* (2013.01); *H04W 4/206* (2013.01); *H04W 12/02* (2013.01)

(58) Field of Classification Search
CPC .. G06N 3/004; G06N 99/005; G06Q 10/2053; G06Q 30/02; G06Q 50/01; G06Q 50/22; H04L 51/32; H04L 63/0876; H04L 65/403; H04L 67/306; H04L 51/34; H04L 63/0407; H04L 63/0421; H04L 67/104; H04M 1/26; H04W 4/206; H04W 12/02
See application file for complete search history.

(56) References Cited

U.S. PATENT DOCUMENTS

| | | | |
|---|---|---|---|
| 5,950,200 A | 9/1999 | Sudai et al. | |
| 2006/0256959 A1* | 11/2006 | Hymes | H04M 1/26 379/433.04 |
| 2009/0070133 A1* | 3/2009 | Bonilla | G06Q 50/22 705/1.1 |
| 2009/0254417 A1* | 10/2009 | Beilby | G06N 3/004 706/45 |

(Continued)

*Primary Examiner* — Le H Luu
(74) *Attorney, Agent, or Firm* — Parker Ibrahim & Berg LLP; James M. Behmke; Stephen D. LeBarron (57) ABSTRACT

In one embodiment, a message may be received from an initiating user over a computer network including an indication of a target user selected by the initiating user and of a plurality of other users selected by the initiating user. A message is then sent to the target user over the computer network prompting the target user to indicate a level of the target user's romantic interest toward each of the initiating user and the plurality of other users. Next, an indication of the target user's romantic interest toward each of the initiating user and the plurality of other users is received over the computer network. Then, a message is sent to the initiating user over the computer network notifying the initiating user of the target user's romantic interest toward the initiating user. Other user-associated questions/responses may also be used, thus anonymously soliciting the responses in a similar manner.

18 Claims, 9 Drawing Sheets

(56) References Cited

U.S. PATENT DOCUMENTS

| | | | |
|---|---|---|---|
| 2011/0131085 A1* | 6/2011 | Wey | G06Q 30/02 |
| | | | 705/14.16 |
| 2012/0005204 A1* | 1/2012 | Diaz | G06N 99/005 |
| | | | 707/733 |
| 2012/0102105 A1* | 4/2012 | Bigel | G06Q 50/01 |
| | | | 709/204 |
| 2014/0279622 A1* | 9/2014 | Lamoureux | G06Q 10/1053 |
| | | | 705/319 |
| 2014/0379729 A1* | 12/2014 | Savage | H04L 65/403 |
| | | | 707/748 |
| 2015/0142839 A1* | 5/2015 | Ochandio | G06Q 50/01 |
| | | | 707/758 |
| 2015/0150100 A1* | 5/2015 | Soni | H04L 63/0876 |
| | | | 726/7 |
| 2015/0341297 A1* | 11/2015 | Barfield, Jr. | H04L 51/32 |
| | | | 709/206 |
| 2015/0373142 A1* | 12/2015 | Lee | H04L 67/306 |
| | | | 709/204 |

* cited by examiner

ANONYMOUS SOLICITATION OF A RESPONSE TO A USER-ASSOCIATED QUESTION

RELATED APPLICATION

The present application claims the benefit of and priority to U.S. Provisional Appl. Ser. No. 62/045,402, entitled ANONYMOUS GAUGING OF ONE'S CHANCES FOR A ROMANTIC RELATIONSHIP, filed on Sep. 3, 2014 by Lurye, et al., the contents of which are herein incorporated by reference in its entirety.

TECHNICAL FIELD

The present disclosure relates generally to digital or online dating methods, and, more particularly, to anonymously gauging romantic interests, such as through the anonymous solicitation of a response to a user-associated question.

BACKGROUND

The online dating industry is a multi-billion dollar industry that continues to experience rapid growth in revenues and user base. Typical online dating systems allow individuals to find and contact others over a computer network (e.g., the Internet) to start a conversation, arrange a date, etc., usually with the objective of developing a romantic relationship. Through the use of network-enabled devices, such as computers, smart phones, tablets, and the like, users can provide personal information (e.g., age, gender, location, occupation, interests, etc.) and search the service provider's database for other users who represent a potential romantic match. Online dating services may assist in the matchmaking process by employing a variety of algorithms, often intended to match users based on one or more common criteria.

SUMMARY

According to one or more embodiments of the disclosure, a message is received from an initiating user over a computer network including an indication of a target user selected by the initiating user and of a plurality of other users ("decoys") selected by the initiating user. A message is then sent to the target user over the computer network prompting the target user to indicate a level of the target user's romantic interest toward each of the initiating user and the plurality of other decoy users. Next, an indication of the target user's romantic interest toward each of the initiating user and the plurality of other users is received over the computer network. Then, a message is sent to the initiating user over the computer network notifying the initiating user of the target user's romantic interest toward the initiating user.

Further embodiments of the disclosure are described below, and the above example is not meant to limiting to the scope of the invention herein. For instance, other questions/responses may also be used, thus anonymously soliciting the responses in a similar manner.

BRIEF DESCRIPTION OF THE DRAWINGS

The foregoing and other objects, features, aspects and advantages of the embodiments disclosed herein will become more apparent from the following detailed description when taken in conjunction with the following accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

A computer network is a geographically distributed collection of nodes interconnected by communication links and segments for transporting data between end nodes, such as personal computers and workstations, or other devices. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links. The Internet can be considered a WAN as well, and is used by businesses, governments, organizations, and individuals for a myriad of purposes. For the purposes of the present disclosure, a "computer network" refers to any of the above examples, as well as other examples not described herein that would be understood by a person of ordinary skill in the art to constitute a computer network.

Figure 1:
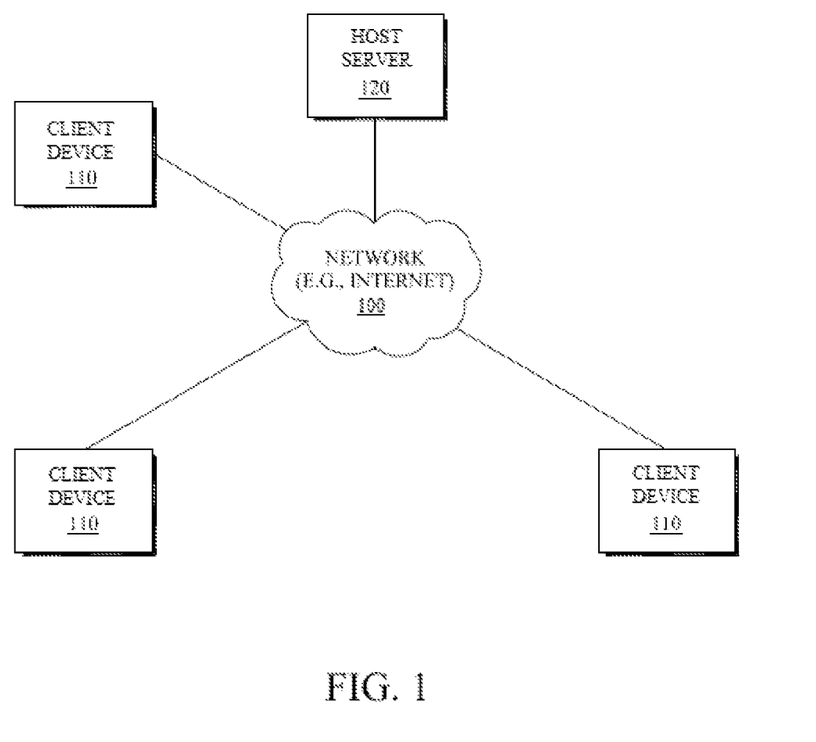
FIG. 1 illustrates an example computer network.

As shown in FIG. 1, an example computer network 100 may comprise a plurality of network devices, such as routers, switches, computers, and the like, interconnected by communication links. For instance, the plurality of network devices may interconnect one or more user devices 110 (hereinafter "client devices" 110) which are operable by a user, such as computers, smart phones, tablets, etc. The communication links interconnecting the various network devices may be wired links or shared media (e.g., wireless links) where certain devices may be in communication with other devices, based on distance, signal strength, current operational status, location, and the like. The communication links may interconnect the various network devices in any feasible configuration. A host device and/or server 120 (hereinafter "host server" 120) may be in communication with the network 100 and thus to the plurality of client devices 110. Those skilled in the art will understand that any number and arrangement of nodes, devices, links, etc. may be used in a computer network.

Figure 2:
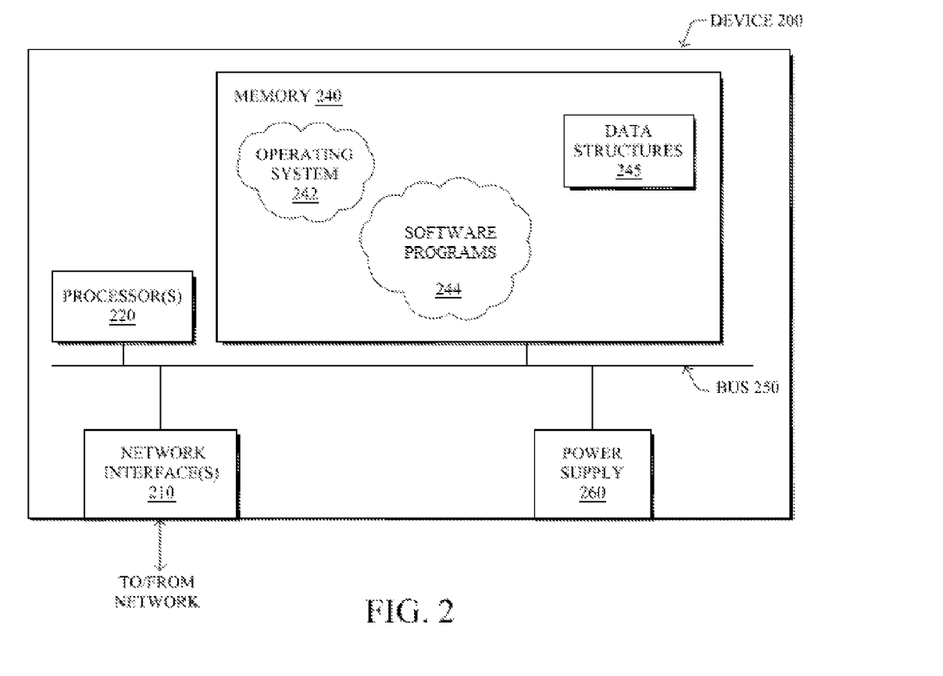
FIG. 2 illustrates an example device.

Illustratively, the host server 120 and client devices 110, may be configured in any suitable manner, such as the example device 200 of FIG. 2. For instance, device 200 may comprise one or more network interfaces 210 (e.g., wired, wireless, cellular, etc.), one or more processors 220, a memory 240, and a power supply 260 (e.g., plug-in, battery, etc.), interconnected by a system bus 250. The network interface(s), e.g., transceivers, contain the mechanical, electrical, and signaling circuitry for communicating data over wireless links coupled to the network. The network interface may be configured to transmit and/or receive data using a variety of different communication protocols as will be understood by those skilled in the art.

Data packets (e.g., traffic and/or messages sent between the devices/nodes) may be exchanged among the devices of the computer network—via the network interface(s), for example—using predefined network communication protocols such as certain known wired protocols, wireless protocols, cellular protocols, etc.

The memory 240 comprises a plurality of storage locations that are addressable by the processor(s) and the network interface(s) for storing software programs and data structures associated with the embodiments described herein. The processor(s) may comprise necessary elements or logic adapted to execute the software programs 244 and manipulate the data structures 245 associated with the techniques herein (e.g., operating depending on whether the device 200 is a client device 110 or a host server 120, accordingly). An operating system 242, portions of which are typically resident in memory and executed by the processor, functionally organizes the device by, inter alia, invoking operations in support of software processes and/or services executing on the device. These software processes and/or services may comprise processes for anonymously gauging one's chances for a romantic relationship, as described in greater detail below.

It will be apparent to those skilled in the art that other processor and memory types, including various computer-readable media, may be used to store and execute program instructions pertaining to the techniques described herein. Also, while the description discloses various processes, it is expressly contemplated that various processes may be embodied as modules configured to operate in accordance with the techniques herein (e.g. according to the functionality of a similar process).

As noted above, online dating services allow individuals to meet and communicate with one another over a computer network (e.g., the Internet) in order to facilitate a personal or romantic relationship. Typically, in order to use an online dating service, a user may start by creating a profile with basic information, such as gender, age, location, interests, photos, and the like. Many online dating services allow users to browse or search through a database of other users, while other services only allow users to view profiles of "matches" who have already been deemed as compatible by a matchmaking algorithm. Several online dating services exist with a wide range of features and functionality; though a primary objective of virtually all online dating services is facilitating a real-life relationship between two individuals.

The techniques herein enable users to anonymously gauge their chances for a romantic relationship with other people, particularly other people in their own social circles. As a result, users may avoid the potential humiliation of public rejection by anonymously determining what their "crush" (e.g. a person for whom a user feels affection) thinks of them before they make their first "move." The techniques may be implemented as a computer program (e.g., mobile application, web browser-based application, etc.) that may be executed over a computer network (e.g., the Internet). Further, the techniques may be integrated with various social networking services, thus leveraging the pre-existing social networks or social circles which have been developed within the construct of the various social network services.

Generally, according to one or more embodiments of the disclosure as described in detail below, a message may be received from an initiating user over a computer network including an indication of a target user selected by the initiating user and of a plurality of other users ("decoys") selected by the initiating user. A message is then sent to the target user over the computer network prompting the target user to indicate a level of the target user's romantic interest toward each of the initiating user and the plurality of other users (decoys). Next, an indication of the target user's romantic interest toward each of the initiating user and the plurality of other users is received over the computer network. Then, a message is sent to the initiating user over the computer network notifying the initiating user of the target user's romantic interest toward the initiating user.

Furthermore, the initiating user may select the target user and the plurality of other users/decoys out of a common social circle, which may be defined by a social networking service. The sending of the message to the target user prompting the target user to indicate the level of the target user's romantic interest toward each of the initiating user and the plurality of other users may include masking an identity of the initiating user, so as to hinder the target user from ascertaining the identity of the initiating user. Also, the received indication of the target user's romantic interest toward each of the plurality of other users may be discarded, wherein the initiating user is not notified of the target user's romantic interest toward each of the plurality of other users.

Other questions/responses may also be used, thus anonymously soliciting the responses in a similar manner, as described in greater detail below.

FIGS. 3-6 illustrate various example depictions of a user interface of an exemplary computer program enabling a user to anonymously gauge his or her chances for a romantic relationship. In particular, a process for anonymously gauging a user's romantic interest toward another user may be implemented as a system (e.g. computer program) hosted on a host server 120 and interfaced with the users through client devices 110, as described below.

The process may begin with a user (e.g., the "initiating user") logging into the system, should a login be required. The initiating user may have a profile containing personal information stored at the host server. The personal information contained in the profile may have been previously inputted by the initiating user and may include any type of personal information, such as name, address, email address, age, gender, location, and the like. Login-applicable information may also be inputted and stored, such as login name and password. All users may create a user profile to be stored at the host server in a similar manner, whereby all users may have their information stored in a database on the host server or a remotely accessible database. Alternatively, the system may integrate one or more social network services and access the same information via a social networking profile belonging to the initiating user. By integrating social networking services (e.g., a FACEBOOK account), the initiating user may login using his or her social network credentials to a) verify his or her identity, and b) access a list friends, as well as friends of friends. It should be understood that the processes for logging in, storing personal information, authenticating a user, and so forth, as described above, may be modified and configured in any manner suitable for authenticating the initiating user and accessing basic information of the initiating user.

Figure 3:
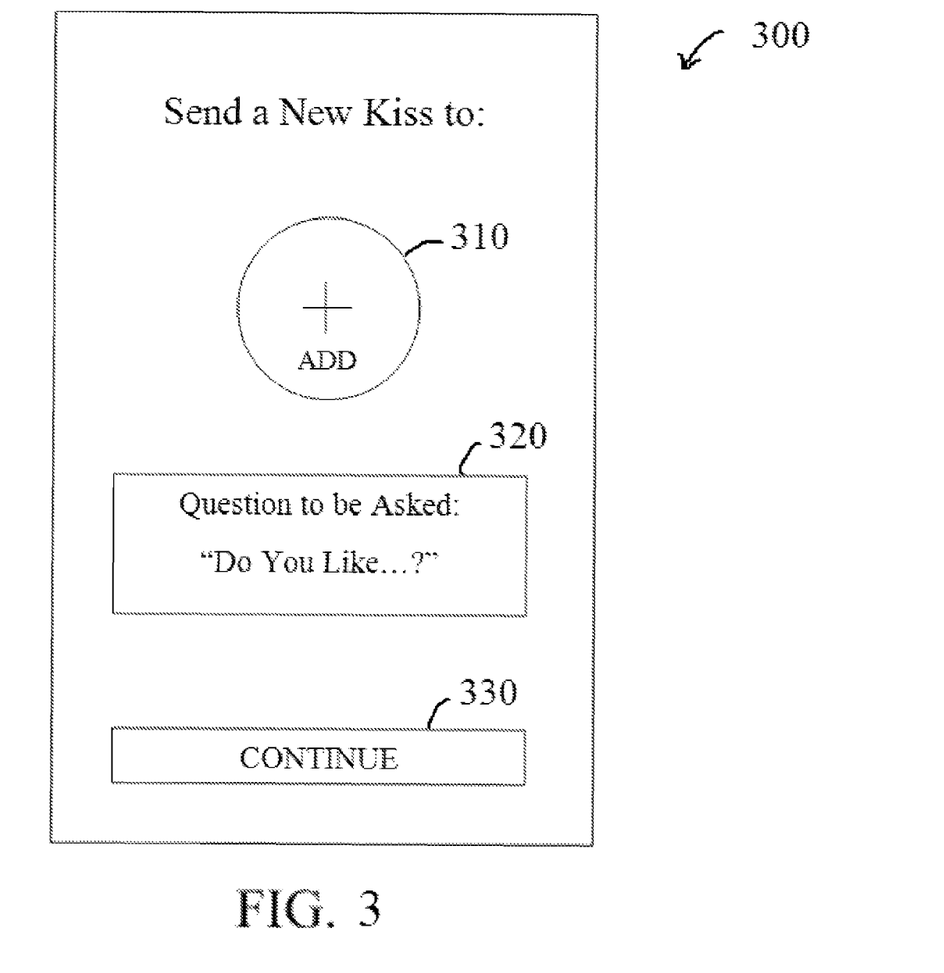
FIGS. 3-6 illustrate example user interfaces of a software application for use with anonymously soliciting a response to a user-associated question.

Once into the application or "app", as shown in the example graphical user interface (GUI) 300 of FIG. 3, the initiating user may the select a person to target (e.g., the "target user") using an "add" button 310, in order to anonymously gauge a level of the target user's romantic interest toward the initiating user. As an example, within particular social circles, such as middle school, high school, or college, the target user may represent the initiating user's "crush." Thus, in the event that the initiating user would desire to ask the target user out on a date, it may be helpful for the initiating user to know what the target user thinks of him or her prior to approaching the target user. This way, the risk of potential humiliation resulting from the target user rejecting the initiating user's advance may be mitigated. As described in further detail below, the target user may indicate his or her level of romantic interest toward the initiating user (e.g., whether or not, or to what extent, the target user "likes" the initiating user).

The initiating user may select the target user in a variety of ways. For example, in one embodiment, the initiating user may simply input contact information of the target user, such as an email address, phone number, etc. Additional target user-related information may be inputted, such as the target user's name. Alternatively, or additionally, the initiating user may search for and select a profile of the target user, in a case where information of the target user has previously been inputted, or is otherwise accessible to the system (e.g., selecting from a plurality of FACEBOOK "friends"). Notably, the initiating user may select the target user using a client device that is connected to the host server 120 over a computer network (as described above), and the selection may be performed through a mobile application, a web-based or browser-based application, and the like, being executed on the initiating user's client device 110.

In addition, in certain embodiments, the initiating user may be able to select from a plurality of different default questions (box 320), or else may be able to create his or her own question. Example questions may include, e.g., "Do you like . . . ?", "Would you go on a date with . . . ?", "Would you do to the dance with . . . ?", "Would you go to the movies with . . . ?", and so on. Once the target user 310 and the question to ask 320 are established, the initiating user may continue (box 330) to the next screen in FIG. 4.

Figure 4:
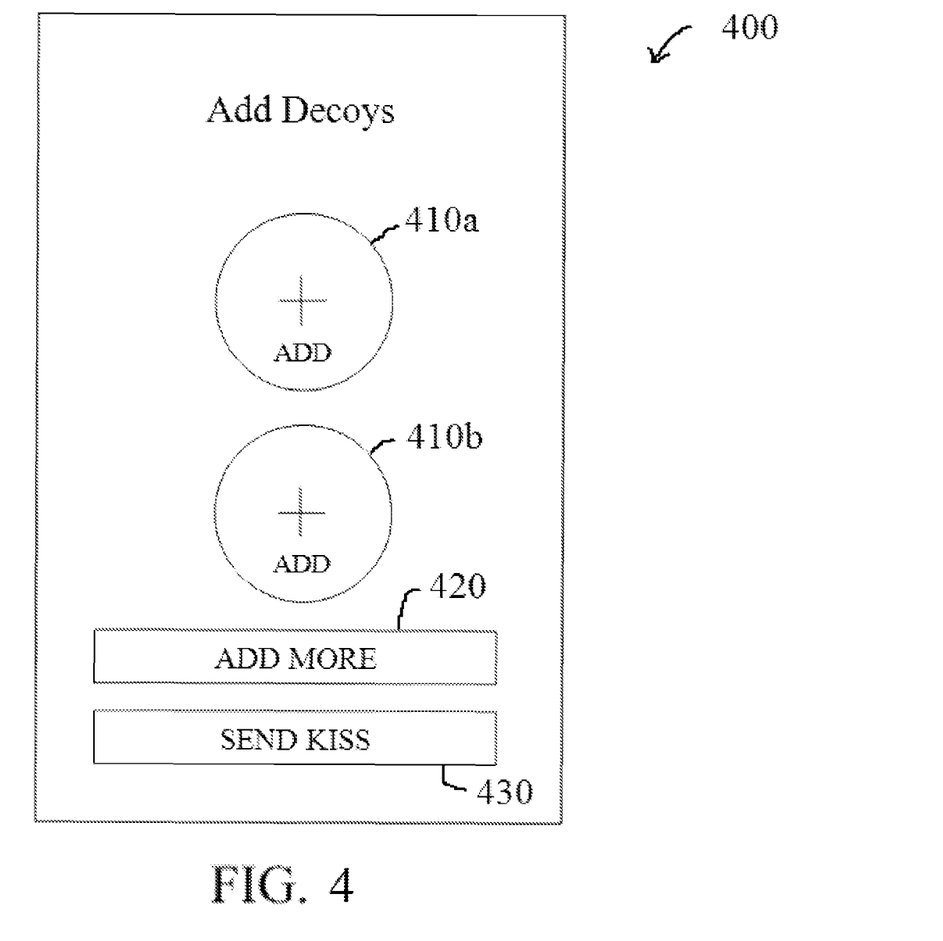

In particular, as shown in the example GUI 400 of FIG. 4, the initiating user may then select a plurality of other users (e.g., the "cover" or "decoys") 410a and 410b for the target user to indicate his or her romantic interest toward. That is, as described further below, the target user will be prompted to indicate his or her romantic interest toward the initiating user, as well as each of the plurality of other decoy users, as selected by the initiating user. In this manner, the selection of the plurality of other users may be utilized in order to mask the identity of the initiating user, since the target user will not know the identity of the initialing user. Rather, the target user will only know that one of the initiating user and the plurality of other users is, in fact, the initiating user.

The initiating user may select the plurality of other users in the same or similar manner as the initiating user selects the target user, as described above. The initiating user may select any other users, and may add more than only two, as desired (e.g., box 420). However, the initiating user may limit his or her selection to users within the same social circle as the initiating user and the target user (assuming the initiating user and the target user are also in the same social circle), or the system may limit the initiating user's selection to users within the same social circle. The social circle may represent an informally developed social circle, as in a group of friends at school, a club, a sports team, etc., and the initiating user may select a plurality of other users within a common social circle that is shared by the initiating user, the target user, and the plurality of other users. Conversely, the social circle may be derived from social networks developed within a social network service (e.g., FACEBOOK). Thus, the system may integrate one or more social networking services to leverage pre-existing information about the initiating user, target user, and other users. Notably, the initiating user may select the plurality of other users using a client device that is connected to the host server over a computer network (as described above), and the selection may be performed through a mobile application, a web-based or browser-based application, and the like, being executed on the initiating user's client device. It should be understood that the initiating user may select the target user and the plurality of other users in any suitable manner, and the above examples are merely for demonstration purposes.

Upon selection of the target user, message, and decoys, the initiating user may initiate the message to the target user (e.g., a "kiss"), such as by selecting box 430 as in FIG. 4. At this time, a message (e.g., one or more data packets) may be sent from the initiating user's client device 110 to the host server 120 over the computer network 100. The message may include an indication of the target user, as selected by the initiating user, and an indication of the plurality of other decoy users, as selected by the initiating user. The message may also represent a request to the host server to send a message to the target user to indicate a level of the target user's romantic interest toward each of the initiating user and the plurality of other users. Information relating to the request may be stored in a database at the host server or a remotely accessible database, whereby the information may include, for example, an indication of the identity of the initiating user, the target user, and/or the plurality of other users, contact information of the initiating user, the target user, and/or the plurality of other users, a request ID, a token, and the like. Additional information may later be stored along with the request, such as an indication of the target user's level of romantic interest toward the initiating user.

Once the request has been received at the host server 120, the host server may send a message (e.g., one or more data packets) to the target user's device 110 over the computer network 100, prompting the target user to indicate a level of the target user's romantic interest toward each of the initiating user and the plurality of other users (or other appropriate response depending upon the asked question, accordingly).

Figure 5A:
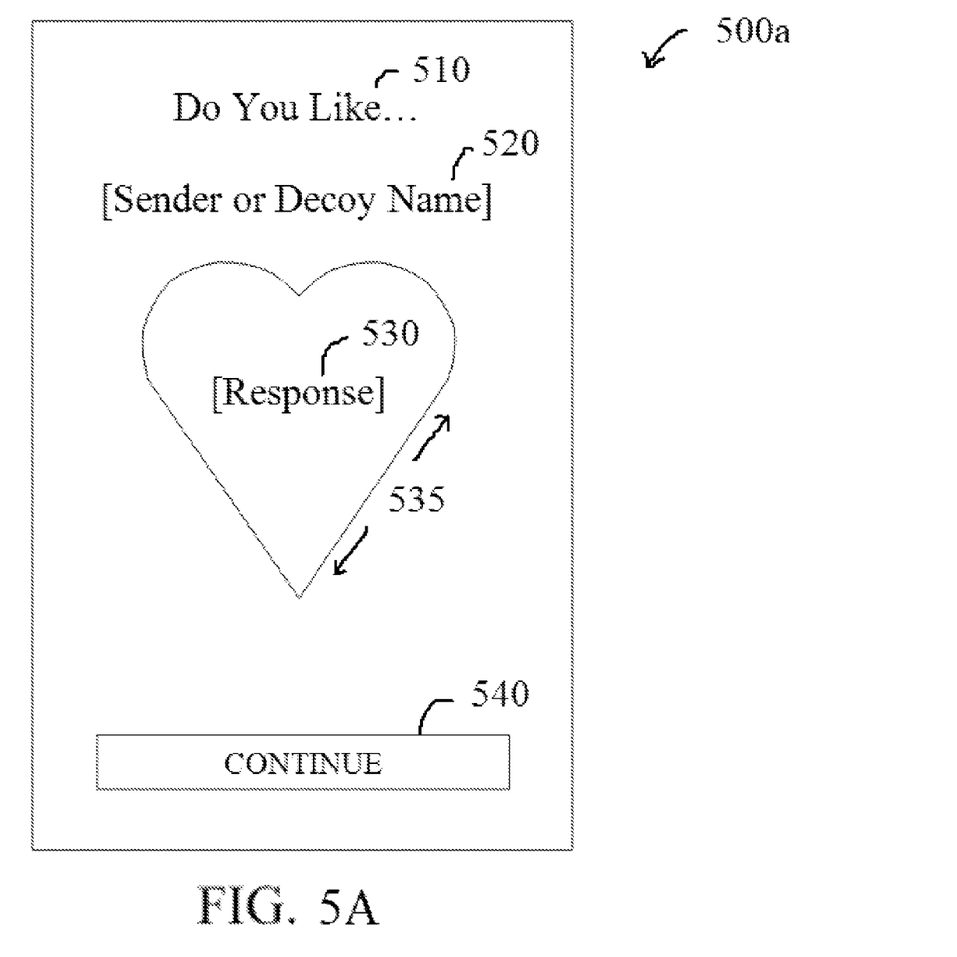
Figure 5B:
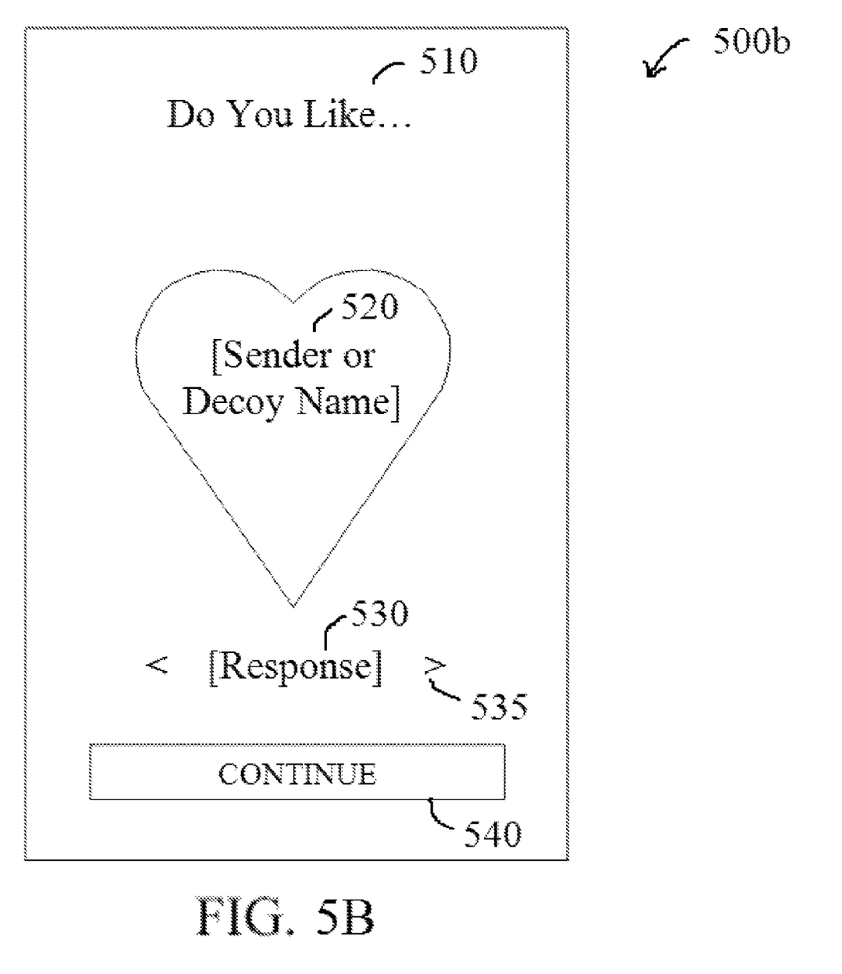

As shown in the example GUIs 500a and 500b of FIGS. 5A and 5B, respectively, the target user may receive the message on a client device that is connected to the host server over the computer network. The message may be transmitted in a variety of ways, including, but limited to, an email, a text message, a phone call, a mobile application notification, and the like. The message indicates the question asked (510) and identities of the initiating user and the plurality of other decoy users, and may include an indication that one of either the initiating user or the plurality of other users has initiated the message. However, the exact identity of which user initiated the message is not revealed to the target user. Therefore, the exact identity of the initiating user is unknown to the target user, so the initiating user may avoid feeling self-conscious about requesting the target user's romantic feelings toward him or her. Of course, selecting people as the plurality of other users with whom the target user does not maintain a close relationship may unintentionally reveal the identity of the initiating user. Thus, the system may encourage the initiating user to select people in a common social circle shared by the initiating user and the target user as the plurality of other users by providing a reminder to the initiating user, by restricting the selection options of the initiating user, or by suggesting people for selection to the initiating user.

Although the format of the message may vary, such as showing all of the users (initiating user and decoy users) at once, FIGS. 5A and 5B illustrate an example where each user 520 (initiator/sender or decoy) is presented individually (e.g., and in a randomized order), and the target user's response 530 is solicited for each user individually, continuing (box 540) between each of the presented users. Note that in FIG. 5A, the response 530 may be presented as a graphic, where various responses may be selected through one or more means, such as a slider bar 535 that scrolls through optional responses. Alternatively, in FIG. 5B, the graphic may be a profile picture of the user 520, and a separate response field 530 may be associated with its own set of selector/scroll buttons 535.

Said differently, the message 500 includes a prompt to the target user to indicate a response 530 to the question 520, e.g., a level of the target user's romantic interest, with respect to each of the initiating user and of the plurality of other users. In this regard, the target user may indicate the response (e.g., level of romantic interest) toward these users in a wide variety of ways. For example, the target user may respond to the prompt in the manner which the message was received, e.g., via a text/audio-based message, via a phone/video-based call, via email or other online-based message, via a mobile application, or any other suitable manner. Example responses may include such options as "Absolutely," "Probably," "Unlikely," "Not a chance," and so forth. Further examples of pre-generated responses may include a range from "No thanks," to "Stay friends," "Get to know me first," "I like you, too," up to simply "yes!" In particular, the responses may be derived from a list associated with the particular question, such that the target user may select the appropriate response from the list, or else the target user may input a custom textual response (if allowed by the system to prevent mean/bullying responses). Also, the target user may alternatively (or additionally) input a rating, such as a numerical-based rating (e.g., from 1 to 10, from 0% to 100%, etc.), via any suitable input mechanism (e.g., radio buttons, textual input bar, sliding bar, etc.). It should be noted that a wide variety of methods for indicating one's romantic interest may be utilized, and the above examples are merely for demonstration purposes. Notably, the target user may provide the above responses via a client device that is connected to the host server over a computer network (as described above), and the input may be performed through a mobile application, a web-based or browser-based application, and the like, being executed on the target user's client device.

After the target user has inputted the indication of his or her responses to the questions (e.g., level of romantic interest) with respect to each of the initiating user and of the plurality of other decoy users, the target user's client device may send a message to the host server over the computer network. That is, the host server 120 receives an indication of the target user's responses (e.g., romantic interest) toward each of the initiating user and the plurality of other users. The target user's response (e.g., romantic interest) toward the initiating user (e.g., the "result") may be stored in a database on the host server or a remotely accessible database in association with the original request made by the initiating user. Notably, the host server may also be made aware of the target user's response (e.g., romantic interest) toward the plurality of other decoy users. However, rather than storing this information, the system may simply discard and/or delete any indication of the target user's response (e.g., romantic interest) toward the plurality of other users, as the initiating user may only be interested in knowing the target user's response (e.g., romantic feelings or lack thereof) toward himself or herself. Alternatively, the level of the target user's romantic interest toward the plurality of other users may be stored along with the request for optional use.

Figure 6:
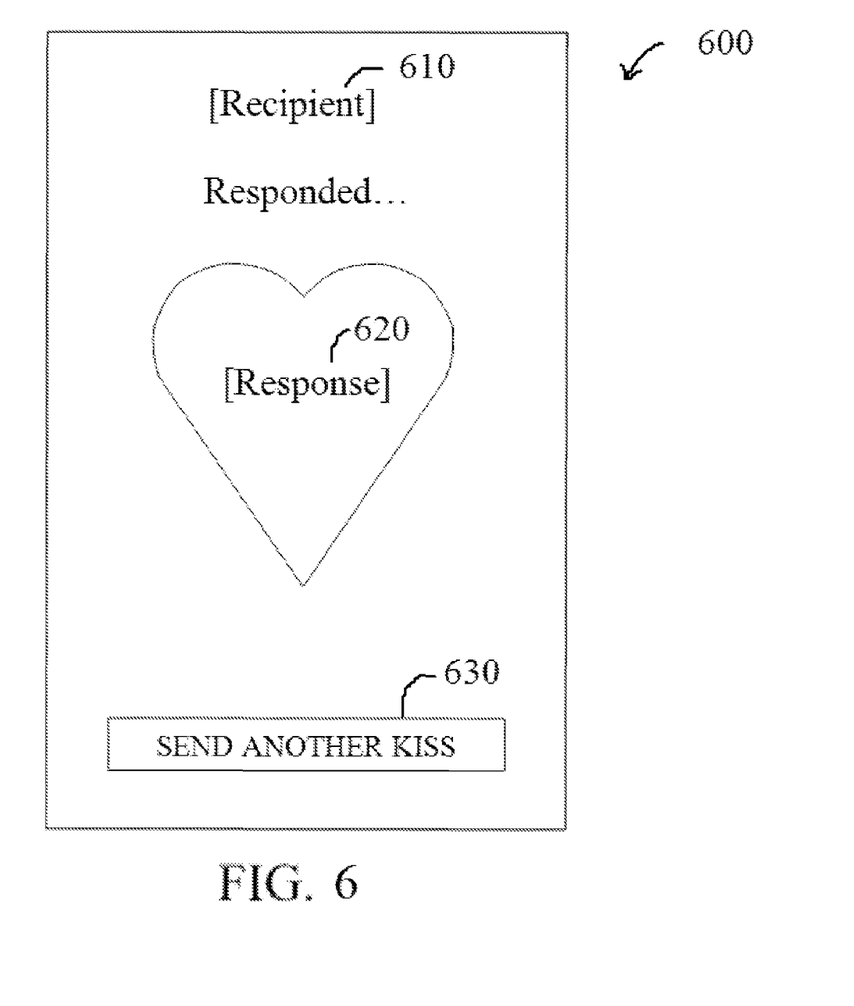

The host server may then send a message (e.g., the "notification") to the initiating user (i.e., to the client device of the initiating user) over the computer network notifying the initiating user of the target user's response to the question asked (e.g., romantic interest) toward the initiating user, based on the information provided from the target user with respect to the initiating user. Preferably, the initiating user is not notified of the level of the target user's responses (e.g., romantic interest) toward the plurality of other users, in order to maintain a degree of privacy regarding the other users. Similar to the manner in which the target user inputs his or her responses (e.g., level of romantic interest) toward the relevant users, the notification of the target user's response (e.g., romantic interest) toward the initiating user may be provided to the initiating user in a wide variety of ways. For example, the initiating user may receive the notification in the manner which the initiating user sent the original request, or in any other manner, including, for example, via a text/audio-based message, via a phone/video-based call, via email or other online-based message, via a mobile application, and the like. The example GUI 600 of FIG. 6 illustrates one possible format, where the recipient (target user) 610 may be associated with the corresponding response 620 directed toward the initiating user. (Another inquiry or "kiss" may be sent through box 630 to one or more other target users, particularly where the response was perhaps negative in nature . . . )

Various options for further action by the initiating user may also be presented to the initiating user upon being notified of the level of the target user's romantic interest toward the initiating user. For instance, if the initiating user so desires, the system may allow the initiating user to "follow-up" with the target user, by sending a selected/pre-generated message or customized message to the target user via the host server over the computer network. Also, once the initiating user receives the target user's response, and the target user has indicated that he or she is romantically interested in the initiating user, the initiating user and the target user may subsequently engage in a chat session in order to communicate directly with one another. Alternatively, the chat session may be activated only when the initiating user indicates that he or she is has a mutual romantic interested in the target user. Further, the system may integrate with other social- and entertainment-based services, so as to provide information relating to a location for going on a date, such as a restaurant, a movie theater and/or movie, a park, and so forth.

Furthermore, the users may have the opportunity to unlock additional features (either pay-based features or otherwise) to enhance the functionality of the system. For example, the initiating user may unlock a feature (e.g., by paying a fee) allowing him or her to select additional decoy users to be a part of the plurality of other decoy users. That is, the initiating user may be allowed to select up to a pre-established number of other users, and by unlocking the feature, may be allowed to select additional other users, thereby increasing the level of anonymity, as it becomes more unlikely that the target user can ascertain the identity of the initiating user when faced with an increased number of users to "rate." Conversely, the target user may unlock a feature (e.g., by paying a fee) allowing him or her to delete a certain number of non-initiating users when a request to rate users is received. That is, the target user may be allowed to reduce the number of users to rate, thereby reducing the number of users who potentially initiated the request, and also reducing the level of anonymity. Thus, the target user may be more apt to ascertain the identity of the initiating user.

The techniques described herein, therefore, provide for a method of anonymously gauging one's chances ten a romantic relationship. Anonymity of the initiating user can be achieved by allowing the initiating user to select a plurality of other users, preferably in a common social circle, to act as "cover" (i.e., to conceal the identity of the user that is romantically interested in the target user). Thus, the initiating user may directly contact the target user via the host server in an anonymous fashion by inputting the email, phone number, or other identifying information of the target user; then, a message is sent to the client device of the target user over the network using the desired means of communication. Further, the initiating user will not see the target user's responses for the plurality of other users. Rather, this information may be discarded or saved in a database, but not shown to the initiating user.

Figure 7:
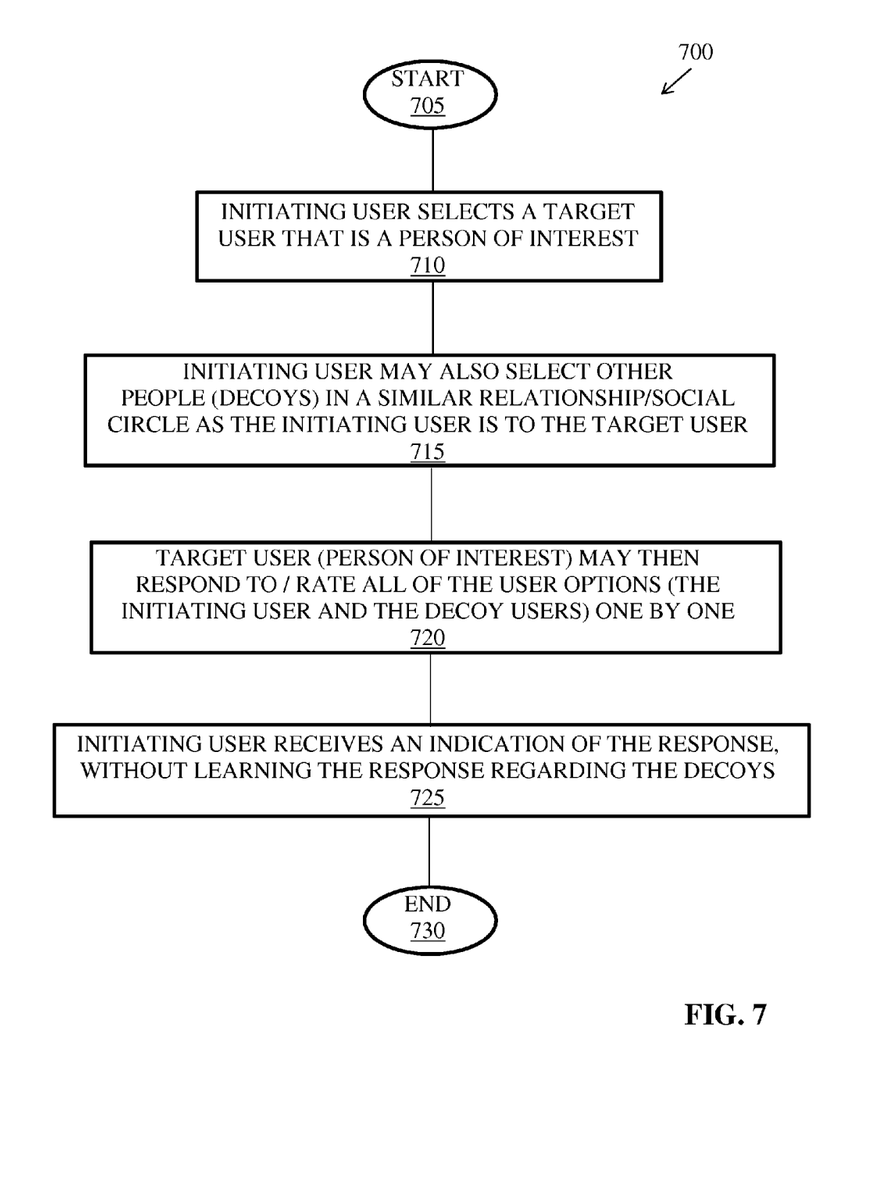
FIGS. 7-8 illustrate example simplified procedures for anonymously soliciting a response to a user-associated question.

FIG. 7 illustrates an example high-level procedure of the anonymous gauging of romantic interest (or otherwise). For instance, procedure 700 starts in step 705, and continues to step 710 where the initiating user selects a target user that is a person of interest (e.g., a "crush"). Next, the initiating user may also select other people (decoys) in a similar relationship/social circle as the initiating user is to the target user in step 715. The target user (person of interest) may then respond to/rate all of the user options (the initiating user and the decoy users) one by one in step 720, such that the initiating user receives an indication of the response in step 725, without learning the response regarding the decoys. Notably, the simplified example procedure 700 may end in step 730, and the decoy responses may be correspondingly deleted.

Figure 8:
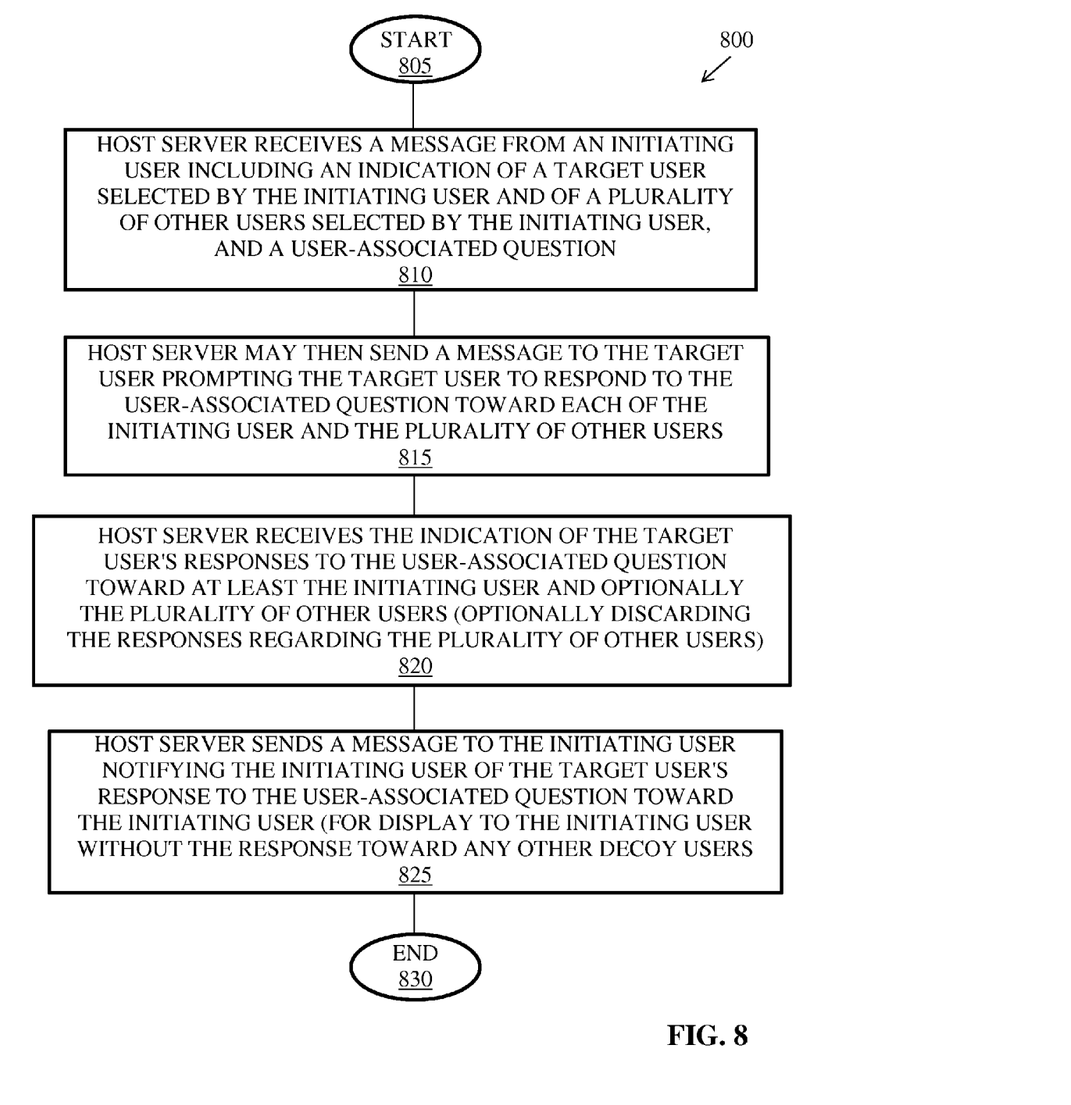

FIG. 8, on the other hand, illustrates an example high-level procedure of the anonymous solicitation of a response to a user-associated question, generally. For instance, procedure 800 starts in step 805, and continues to step 810 where a host server 120 receives a message from an initiating user (device 110) over a computer network 100 including an indication of a target user selected by the initiating user and of a plurality of other users selected by the initiating user, and a user-associated question. In particular, as described above, an initiating user application may receive an indication of a target user selected by an initiating user, an indication of a plurality of other users selected by the initiating user, and may determine a user-associated question (e.g., default or selected by the initiating user).

In step 815, the host server may then send a message to the target user over the computer network prompting the target user to respond to the user-associated question toward each of the initiating user and the plurality of other users. In particular, the target user application (of a target user selected by an initiating user) receives the first message that includes an indication of a plurality users and a user-associated question, but as detailed above, this message does not identify the initiating user separately from a plurality of other users selected by the initiating user. As such, the target user application displays a notification to the target user of the user-associated question and the plurality of users, and may then receive responses to the user-associated question toward each of the plurality of users, accordingly, to return at least the target user's response to the user-associated question toward the initiating user. (Note that the target user application may return all responses for filtering by the host server, or else may be configured to only send the response regarding the initiating user. Regardless, the initiating user is not notified of the target user's response to the user-associated question toward the plurality of other users.)

In step 820, the host server receives the indication of the target user's responses to the user-associated question toward at least the initiating user and optionally the plurality of other users (e.g., and optionally discarding the responses regarding the plurality of other users), and in step 825 sends a message to the initiating user over the computer network notifying the initiating user of the target user's response to the user-associated question toward the initiating user. As such, the initiating user application would receive and display the indication/notification of the target user's response to the user-associated question toward the initiating user, but not the response toward any of the other decoy users. The illustrative procedure 800 may then end in step 830.

While there have been shown and described illustrative embodiments that provide for anonymously soliciting a response to a user-associated question, it is to be understood that various other adaptations and modifications may be made within the spirit and scope of the embodiments herein, with the attainment of some or all of their advantages. For instance, though much of the example above is based on anonymously gauging one's chances for a romantic relationship, other user-associated questions may be anonymously solicited in a similar manner, and the techniques herein are not limited to merely romantic interests. Moreover, it should be understood that aspects of FIGS. 1-8, such as the depicted functionality, design, terminology, process steps, and the like, are for demonstration purposes only. Thus, FIGS. 1-8 merely provide an illustration or the disclosed embodiments and do not limit the present disclosure to the aspects depicted therein.

In addition, it is expressly contemplated that the components and/or elements described herein may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a host server device, a message from a client device of an initiating user over a computer network including an indication of a target user selected by the initiating user and of a plurality of other users selected by the initiating user, and a user-associated question;
masking, by the host server device, an identity of the initiating user, to hinder the target user from ascertaining the identity of the initiating user, wherein masking includes including the initiating user within the plurality of other users selected by the initiating user;

sending, from the host server device, a message to the target user over the computer network prompting the target user to respond to the user-associated question toward each of the initiating user and the plurality of other users;

receiving, at the host server device, an indication of the target user's responses to the user-associated question toward each of the initiating user and the plurality of other users over the computer network; and sending, from the host server device, a message to the initiating user over the computer network notifying the initiating user of the target user's response to the user-associated question toward the initiating user.

2. The method of claim 1, wherein the initiating user selects the target user and the plurality of other users out of a common social circle.

3. The method of claim 2, wherein the common social circle is defined by a social networking service.

4. The method of claim 1, further comprising:

discarding, by the host server device, the received indication of the target user's response to the user-associated question toward each of the plurality of other users, wherein the initiating user is not notified of the target user's response to the user-associated question toward each of the plurality of other users.

5. The method of claim 1, wherein the user-associated question solicits the target user to indicate a level of the target user's romantic interest toward each of the initiating user and the plurality of other users.

6. A non-transitory computer-readable medium containing program instructions executable by a computer, the non-transitory computer-readable medium comprising:

program instructions that receive a message from a client device of an initiating user over a computer network including an indication of a target user selected by the initiating user and of a plurality of other users selected by the initiating user, and a user-associated question;

program instructions that mask an identity of the initiating user, to hinder the target user from ascertaining the identity of the initiating user, wherein masking includes including the initiating user within a plurality of other users selected by the initiating user;

program instructions that send a message to the target user over the computer network prompting the target user to respond to the user-associated question toward each of the initiating user and the plurality of other users;

program instructions that receive an indication of the target user's responses to the user-associated question toward each of the initiating user and the plurality of other users over the computer network; and program instructions that send a message to the initiating user over the computer network notifying the initiating user of the target user's response to the user-associated question toward the initiating user.

7. The non-transitory computer-readable medium of claim 6, wherein the initiating user selects the target user and the plurality of other users out of a common social circle.

8. The non-transitory computer-readable medium of claim 7, wherein the common social circle is defined by a social networking service.

9. The non-transitory computer-readable medium of claim 6, further comprising:

program instructions that discard the received indication of the target user's response to the user-associated question toward each of the plurality of other users, wherein the initiating user is not notified of the target user's response to the user-associated question toward each of the plurality of other users.

10. The non-transitory computer-readable medium of claim 6, wherein the user-associated question solicits the target user to indicate a level of the target user's romantic interest toward each of the initiating user and the plurality of other users.

11. A method, comprising:

receiving, at client device executing an initiating user application, an indication of a target user selected by an initiating user;

receiving, at the client device executing the initiating user application, an indication of a plurality of other users selected by the initiating user;

determining, by the client device executing the initiating user application, a user-associated question;

masking, by the initiating user application, an identity of the initiating user, to hinder the target user from ascertaining the identity of the initiating user, wherein masking includes including the initiating user within a plurality of other users selected by the initiating user;

sending, from the client device executing initiating user application, a first message toward a target user application of the target user, the message prompting the target user to respond to the user-associated question toward each of the initiating user and the plurality of other users;

receiving, at the client device executing the initiating user application, a second message including an indication of the target user's response to the user-associated question toward the initiating user; and displaying, by the client device executing the initiating user application to the initiating user, a notification of the target user's response to the user-associated question toward the initiating user.

12. The method of claim 11, wherein the initiating user selects the target user and the plurality of other users out of a common social circle.

13. The method of claim 12, wherein the common social circle is defined by a social networking service.

14. The method of claim 11, wherein the user-associated question solicits the target user to indicate a level of the target user's romantic interest toward each of the initiating user and the plurality of other users.

15. The method of claim 11, wherein determining the user-associated question comprises one of either receiving an indication of the user-associated question as selected by the initiating user, or providing a default user-associated question.

16. A method, comprising:

receiving, at a client device executing a target user application of a target user selected by an initiating user, a first message that includes an indication of a plurality users and a user-associated question, wherein the first message does not identify the initiating user separately from a plurality of other users selected by the initiating user, wherein an identity of the initiating user is masked, to hinder the target user from ascertaining the identity of the initiating user, wherein masking includes including the initiating user within a plurality of other users selected by the initiating user;

displaying, by the client device executing target user application to the target user, a notification of the user-associated question and the plurality of users;

receiving, at the client device executing target user application from the target user, responses to the user-associated question toward each of the plurality of users; and returning, from the client device executing target user application, a second message that indicates at least the target user's response to the user-associated question toward the initiating user, wherein the initiating user is not notified of the target user's response to the user-associated question toward the plurality of other users.

17. The method of claim 16, wherein the initiating user selects the target user and the plurality of other users out of a common social circle.

18. The method of claim 16, wherein the user-associated question solicits the target user to indicate a level of the target user's romantic interest toward each of the initiating user and the plurality of other users.

* * * * *